United States Patent [19]

Jolly

[11] Patent Number: 5,592,590
[45] Date of Patent: Jan. 7, 1997

[54] METHOD FOR EFFICIENTLY DETECTING COVERED RULES IN A KNOWLEDGE BASE

[75] Inventor: Christopher H. Jolly, Clifton Park, N.Y.

[73] Assignee: General Electric Company, Schenectady, N.Y.

[21] Appl. No.: 272,972

[22] Filed: Jul. 1, 1994

[51] Int. Cl.$^6$ .................................................. G06F 17/00
[52] U.S. Cl. .............................. 395/75; 395/66; 395/67
[58] Field of Search .......................... 395/50–51, 60–67, 395/75–77, 600

[56] References Cited

U.S. PATENT DOCUMENTS

| | | | |
|---|---|---|---|
| 3,700,868 | 10/1972 | Silvertson, Jr. ........................ | 235/152 |
| 4,336,468 | 6/1982 | Spillman ................................ | 307/440 |
| 5,416,888 | 5/1995 | Shimokawa ............................ | 395/22 |
| 5,487,134 | 1/1996 | Ballard .................................. | 395/51 |

OTHER PUBLICATIONS

"Computers and Intractability, A Guide to the Theory of NP–Completeness", by Garey, et al, pp. 1–4, 109, 259–261, 1979.

"Minimal Disjunctive Normal Forms", Boolean Functions With Engineering Applications And Computer Programs By G. Winfrid, Sringer–Verlay, Berlin, NY 1989, pp. 103–107. Giarratano, Joseph C. "vol. 1: Rules (CLIPS Version 5.1)". NASA Document JSC–25013.

Primary Examiner—Tariq R. Hapiz
Attorney, Agent, or Firm—David C. Goldman; Marvin Snyder

[57] ABSTRACT

A method for verifying a plurality of rules stored in a knowledge base for consistency. The method identifies rules in the knowledge base that are covered or made useless by at least one rule, two rules, or at three rules. Each rule in the database has at least one option and a corresponding range for satisfying the option. Each of the plurality of rules are compiled into a term. The terms are then arranged into a hierarchical listing with high priority terms being placed before low priority terms. Each term is removed from the hierarchical listing with the high priority terms being removed before the low priority terms. Each removed term is then added to a sum of previously removed terms. Then it is determined if the removed term is covered by the terms in the sum of previously removed terms. Coverage is determined by using an interval consensus procedure which uses an absorption rule, a partial absorption rule, a continuation rule, a simplification rule, and consensus rule.

15 Claims, 5 Drawing Sheets

METHOD FOR EFFICIENTLY DETECTING COVERED RULES IN A KNOWLEDGE BASE

BACKGROUND OF THE INVENTION

The present invention relates generally to knowledge bases, and more particularly to specifying inconsistent rules within a knowledge base of a collection system.

In a conventional collection system, a collection strategy is implemented by specifying rules which indicate how to classify delinquent accounts. The rules are then applied to the delinquent accounts, and the resulting classified accounts are assigned to collectors based on the classification. For example, the accounts classified as highly delinquent may be assigned to the most experienced collector(s), while a slightly delinquent account may receive only a letter indicating the amount owed. The goals in developing a collection strategy include maximizing the collection amount, minimizing expenses, and establishing/keeping customer goodwill. In order to implement a collection strategy, the collection system should implement the strategy as precisely as possible, facilitate specifying and modifying the strategy, and verify that the strategy is consistent. Clearly, there are trade-offs between the competing goals. However, a collection system that is very expressive, for example, facilitates specifying a collection strategy but increases the effort needed to analyze the consistency of a collection strategy.

If the specified rules are inconsistent, then the accounts are not classified according to the collection strategy, and collection effectiveness suffers. Due to the extremely large number of delinquent accounts, the rules are usually classified overnight, using several hours of valuable mainframe CPU time. Inconsistent rules are detected if at all, after the accounts have been classified and assigned to collectors the following day. Since collection strategies change often, it is desirable to be able to verify automatically the consistency of rules while they are being edited, before being used to classify accounts. Verifying the consistency of rules involves identifying rules that are covered or rules that will never execute given any set of delinquent accounts.

However, rules are ambiguous when more than one applies. To resolve the ambiguity, priorities are assigned to the rules. In particular, the rules are written so that rules at the top have the highest priority and rules at the bottom have the lowest priority. Thus, only the highest priority rule that is applicable will execute. An example of a collection of prioritized rules, known as an Assignment Selection List (ASL) is set forth below in Table 1.

which is located at the bottom of the list is classified into the D4 class. Note that the ASL in Table 1 is simplified to show only four rules, where a typical ASL contains between several hundred to one thousand rules.

ASLs are very expressive but difficult to analyze for consistency. Consistency for an ASL is defined as an ASL with no covered rules. A rule is covered if it never executes when classifying an arbitrary set of delinquent accounts. For example, in Table 1, rule number four is covered because it never executes. In order for rule four to execute, the rule must be satisfied while rules one, two, and three, must not be satisfied. In order for rule four to be satisfied, "Num Due" must be less than or equal to two. If rule one is not satisfied, assuming that rule four is satisfied, then either the "Amount Due" is greater than $500 or the "Indicator" is open. However, if the "Amount Due" is greater than $500, then rule three is satisfied, and if the "Indicator" is open, then rule two is satisfied. In order for rule four to be satisfied, then at least one of rules one, two, and three will be satisfied. So rule four is covered and will never execute any set of accounts.

Determining whether a rule in a knowledge base is covered, is a Co-NP-complete problem. It is believed that Co-NP-complete problems do not have a polynomial-time solution. In fact, if there is one polynomial-time solution for any Co-NP-complete problem, then there are polynomial-time solutions for all Co-NP-complete problems. Complete solutions for Co-NP-complete problems can only be achieved for very small problems. Since an ASL can be very large, determining if a rule is covered is intractable, because it requires, determining one by one, whether or not each rule in the ASL is covered.

SUMMARY OF THE INVENTION

Therefore, it is a primary objective of the present invention to provide an efficient method for identifying whether a plurality of rules stored in a knowledge base are covered.

Another object of the present invention is to provide an efficient method for guaranteeing the detection of rules covered by one rule.

Still another object of the present invention is to provide an efficient method for guaranteeing the detection of rules covered by one and two rules.

Another object of the present invention is to provide an efficient method for guaranteeing the detection of rules covered by one, two and three rules.

Thus, in accordance with the present invention, there is provided a method for verifying a plurality of rules stored in

TABLE 1

| Number | Class | Rule |
|---|---|---|
| 1 | A1 | Amount Due <= $500 & Num Due <= 2 & Indicator = Closed |
| 2 | B2 | Amount Due <= $500 & Indicator = Open |
| 3 | C3 | Amount Due > $500 |
| 4 | D4 | Num Due <= 2 |

In Table 1 there are four rules indicating conditions on an account which must be "1" for the rule to be satisfied. For each rule, there is an option (i.e., "Amount Due", "Num Due", and "Indicator") and a corresponding range (i.e., ≦500, ≦2, >500, Closed, and Open) satisfying the option. In this example, the rules are arranged such that the rule with the highest priority is located at the top of the list and is classified into the A1 class and the lowest prioritized rule a knowledge base for consistency, each rule having at least one option and a corresponding range for satisfying the option. The method comprises compiling each of the plurality of rules into a term. Each term has at least one variable corresponding to each option and range in a rule. The terms are arranged into a hierarchical listing with a high priority terms being placed before low priority terms. Each term is removed from the hierarchical listing with the high priority terms being removed before low priority terms. Then each removed term is examined to determine if the removed term is covered by any combination of terms in a sum of previously removed terms, wherein the rules corresponding to the covered terms are covered. The removed term is then added to the sum of previously removed terms.

While the present invention will hereinafter be described in connection with a preferred embodiment and method of use, it will be understood that it is not intended to limit the invention to this embodiment. Instead, it is intended to cover all alternatives, modifications and equivalents as may be included within the spirit and scope of the present invention as defined by the appended claims.

DETAILED DESCRIPTION OF THE PRESENT INVENTION

Figure 1:
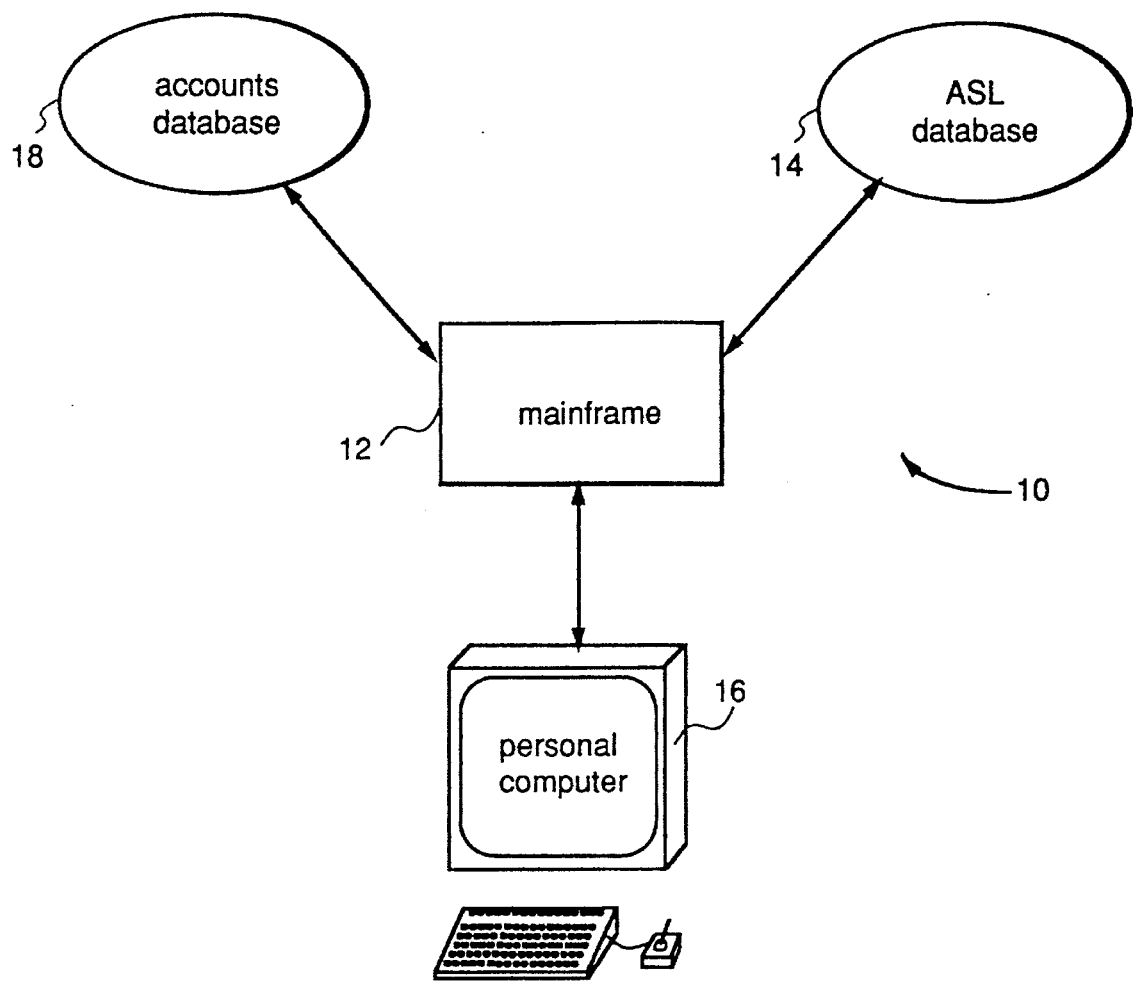
FIG. 1 is a block diagram of a collection system used in the present invention.

FIG. 1 shows a block diagram of a collection system 10 that embodies the present invention. The collection system includes a mainframe 12 for processing large volumes of ASL rules stored in a database 14 with account files stored in database 18. Users are connected to the mainframe by a personal computer(s) 16 which is used to form a strategy from their own experience and intuition and to edit the ASL's stored in the database 14.

The general technique used in the present invention can be illustrated by using an example in Boolean algebra. For example, consider the rules set forth in Table 1. If A represents the condition "Amount Due>$500", N represents the condition "Num Due>2" and I represents the condition "Indicator=Open", then the rules can be rewritten, as shown in Table 2.

TABLE 2

| Assignment Code | Boolean Term |
|---|---|
| A1 | $\bar{A}\,\bar{N}\,\bar{I}$ |
| B2 | $\bar{A}\,I$ |
| C3 | $A$ |
| D4 | $\bar{N}$ |

Note that a bar over a literal element indicates a negation of that element. Thus, $\bar{A}\bar{N}\bar{I}$ represents the rule having conditions "Amount Due≤$500", "Num Due≤2", and "Indicator =Closed"; $\bar{A}I$ represents the rule having the conditions "Amount Due≤$500" and "Indicator=Open"; A represent the rule having the condition "Amount Due>$500"; and $\bar{N}$ represents the rule "Num Due≤2". As above, a term is covered if the term is added to the sum of all terms of higher priority and that sum does not change the term. Using some basic principles of Boolean algebra such as $X+\bar{X}=1$ and $X+\bar{X}Y=X+Y$, the last rule is covered as shown in Table 3. In particular, the fourth rule $\bar{N}$ is added to the sum of the higher priority rules, $I+A+\bar{N}$ resulting in the same sum $I+A+\bar{N}$. Therefore, rule four is covered.

TABLE 3

| Assignment Code | Boolean Rule | Sum |
|---|---|---|
| A1 | $\bar{A}\,\bar{N}\,\bar{I}$ | $\bar{A}\,\bar{N}\,\bar{I}$ |
| B2 | $\bar{A}\,I$ | $\bar{A}\,\bar{N}\,\bar{I} + \bar{A}\,I = \bar{A}\,\bar{N} + \bar{A}\,I$ |
| C3 | $A$ | $\bar{A}\,\bar{N} + \bar{A}\,I + A = \bar{N} + I + A$ |
| D4 | $\bar{N}$ | $\bar{N} + I + A + \bar{N} = \bar{N} + I + A$ |

As described earlier, if a Boolean term does not contribute to the Boolean sum of all previous terms in an ASL, then it is covered. Since minimal representations of Boolean sums are not unique (e.g., $\bar{x}z+y\bar{z}+xy=\bar{x}y+x\bar{z}+\bar{y}z$), it is not sufficient to simply keep a running Boolean sum or even a running minimal Boolean sum. The sum must have a canonical (i.e., unique) form. One type of canonical form is the sum of minterms, but just expressing the sum of minterms requires exponential time and space. Another type of canonical form is the sum of prime implicants.

Before describing how to compute prime implicants, some notation that has been developed for use with interval arithmetic is introduced. Boolean and interval variables are represented by lower-case letters and have the range of values indicated in parentheses. For example, a Boolean expression $\bar{A}N+\bar{A}I$, is represented by $a(0)n(0)+a(0)i(1)$, since Boolean values are either zero or one. Alternatively, the expression can be represented by $a_0n_0+a_0i_1$. In some cases the ranges are not known and thus are specified symbolically. For example, if the range of values of x is r1, then x is represented by x(r1). The union of two ranges is indicated with the '+' operator, e.g., x(r1+r2). Note that x(r1)=1 if range r1 covers all the possible values of x. For example, $x+\bar{x}=1$ can be written as $x(1)+x(0)=x(0,1)=1$.

In this description, terms (variables connected by the logical AND operation) or partial terms are represented by capital letters. For example, if term T represents x(r1) AND y(r2) AND z(r3), then T=x(r1)y(r2)z(r3). The prime (') operator when applied to a term indicates a term with the same variables, but with a subset of the corresponding ranges. For example, if T=x(0,1)y(0,1), then T' could be any of the following terms: x(0,1)y(0,1), x(0)y(0,1), x(1)y(0,1), x(0,1)y(0), x(0)y(0), x(1)y(0), x(0,1)y(1), x(0)y(1), or x(1)y(1).

One way of finding all of the prime implicants of a Boolean function is the consensus procedure described by Quine in Schneeweiss, *Boolean Functions with Engineering Applications and Computer Programs,* Springer-Verlag, New York (1986), which applies the following three rules until none apply:

(1) Absorption: T+TU=T
(2) Simplification: $x+\bar{x}T=x+T$ or $x+xT=x+T$
(3) Consensus: Add to the sum the consensus of any two terms in the sum. The consensus of two Boolean terms that share a variable with one term having the variable negated is the conjunction of the two terms without the common variable. More specifically, if the terms are xT and $\bar{x}U$, then the consensus of these two terms is the term TU.

For example, consider the sum $uy+\overline{uy}+\overline{v}z+uxy+vx\overline{y}+uvxz$. By rule (1), term $uxy$ is absorbed by $uy$. By rule (3), the consensus of $uy$ with $vx\overline{y}$ is $uvx$. And by rule (1), $uvxz$ is absorbed by $uvx$. Now, the sum is $uy+\overline{uy}+\overline{v}z+uxy+vx\overline{y}+uvxz$. By rule (3) the consensus of $\overline{v}z$ with $vx\overline{y}$ is $x\overline{y}z$, and the consensus of $\overline{v}z$ with $uvx$ is $uxz$. Thus, the sum of prime implicants is $uy+\overline{uy}+\overline{v}z+vx\overline{y}+uvx+x\overline{y}z+uxz$.

Generalizing this Boolean consensus procedure to an interval consensus procedure results in the following rules:
(1) Absorption: $T+T'U=T$ (wherein U may be empty). An example is $w_{024}x_{12}+w_{04}x_{12}y_{23}z_{01}$ becomes $w_{024}x_{12}$.
(2) Simplification: $x(r1)T+x(r2)T'U=x(r1)T+x(r1+r2)T'U$ (wherein T may be empty, and $T \neq T'$ if U is empty). An example is $x_{024}y_{12}+x_{14}y_2z_{01}$ becomes $x_{024}y_{12}+x_{0124}y_2z_{01}$
(3) Continuation: $x(r1)T+x(r2)T=x(r1+r2)T$ (wherein T may be empty). An example is $x_{024}y_{12}+x_{14}y_{12}$ becomes $x_{0124}y_{12}$.
(4) Consensus: For $x(r1)T$ and $x(r2)U$, add $x(r1+r2)TU$ (wherein neither T or U can be empty, and $T \neq U$).

Rule (3) and some of the conditions within parentheses are not required, but they make this method more efficient. In rules (2), (3), and (4), if the range of variable x is increased, it is called simplification over variable x, continuation over variable x, and consensus over variable x, respectively.

Figure 2:
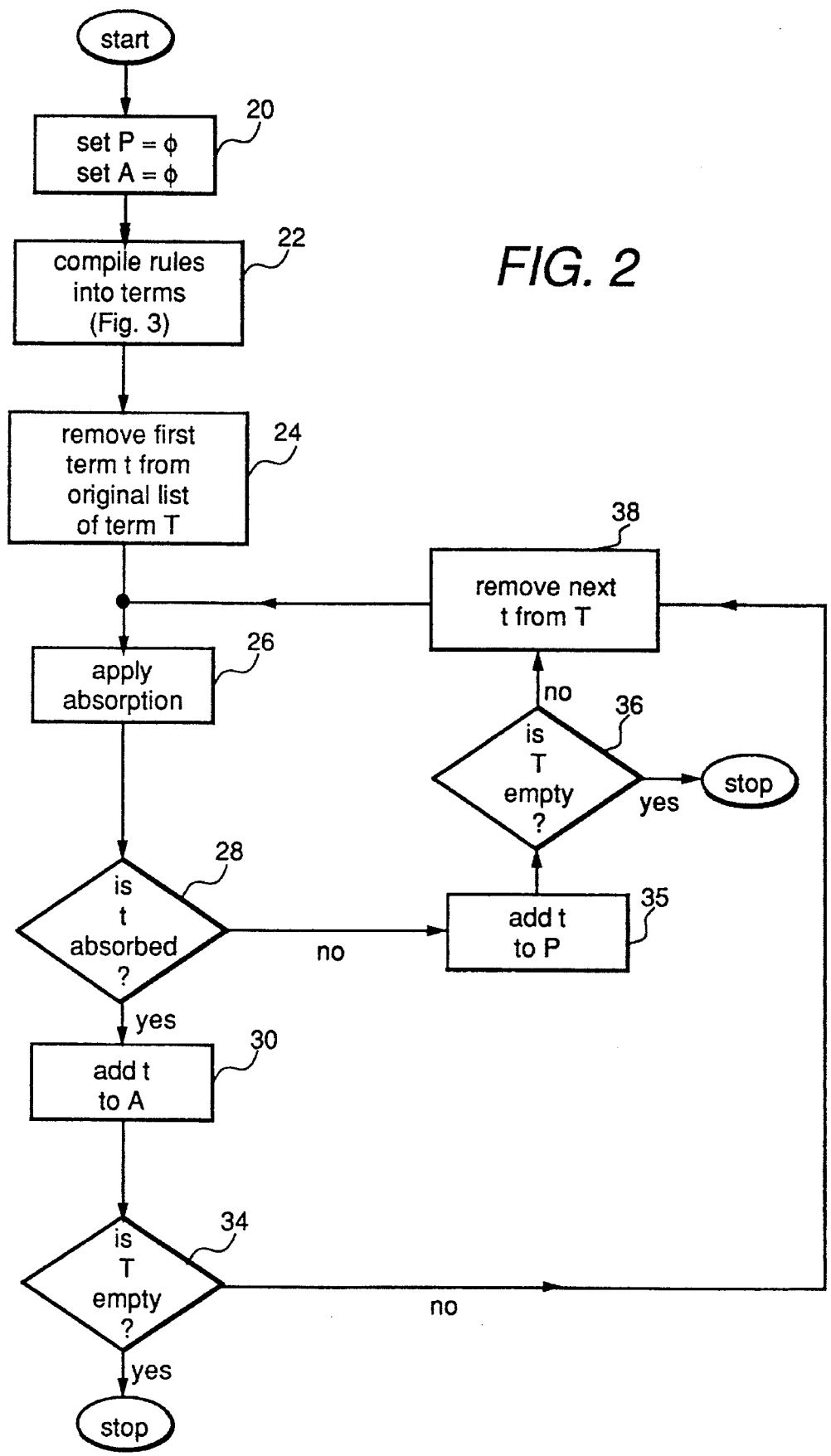
FIG. 2 is a flow-chart describing the present invention for 1-rule coverage.

FIG. 2 discloses a flow-chart of how the present invention determines whether a rule is covered by at least one-rule. First, the running sum (i.e. the SUM in Table 3) represented by variable P is set to empty and the covered terms represented by the variable A is set to empty at 20. Next, the rules in the database are compiled into terms at 22. A description of how the rules are compiled into terms is provided below in reference to FIG. 4. The first term t is removed from the original list of terms T at 24. Then the absorption rule is applied to term t at 26. If t is absorbed by a term in the running sum P at 28, then the term t is covered and recorded in covered terms A at 30. If there are any more terms in T at 34, then the next term t is removed from the original list of terms T at 38 and subjected to the absorption rule. Otherwise, if t is not absorbed by the running sum P at 28, then the term t is added to the running sum P at 32. Then if there are any more terms in T at 36, then the next term t is removed from the original list of terms T at 38.

Figure 4:
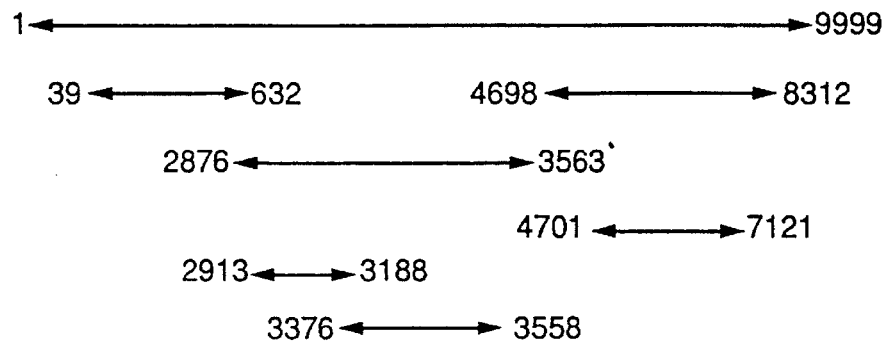
FIG. 4 is an example of assembling a union of ranges for compilation.
Figure 3:
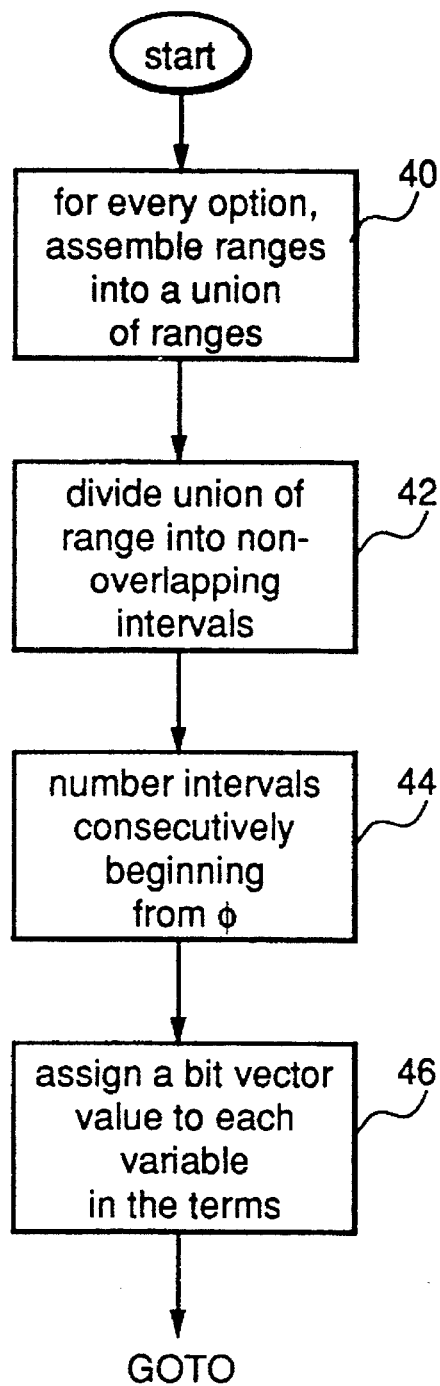
FIG. 3 is a flow-chart describing compilation of rules into terms.

A description of how the plurality of rules in the knowledge base are compiled into terms is provided in the flow chart of FIG. 3. In the present invention, each term has at least one variable corresponding to each option and range in a rule. For example, for the condition "Amount Due≦500", the option is "Amount Due" and the range is [0,500]. For the condition "Dealer 39–632, 2876–3563, 4698–8312", the option is "Dealer" and the ranges are [39–632], [2876–3563], and [4698–8312]. In order to compile the rules into terms, the ranges for each option are assembled into a union of ranges at 40. An example of assembling a union of ranges for the condition "Dealer 39–632, 2876–3563, 4698–8312" is shown in FIG. 4. In this example, the union of all possible ranges is [1,9999]. The union of all possible ranges is divided into non-overlapping intervals at block 42. The non-overlapping intervals in FIG. 4 are [1,38], [39,632], [633,2875], [2876, 2912], ... [8313,9999]. The intervals beginning from [1,38] are numbered consecutively, beginning from zero, at block 44. For example, in FIG. 4, the ranges [1,38], [39,632], [633,2875], [2876, 2912], [2913, 3188], [3189,3375], [3376,3558], [3559, 3563], [3564,4697], [4698,4700], [4701,7121], [7122,8312], [8313,9999] are numbered 0, 1, 2, 3, 4, 5, 6, 7, 8, 9, 10, 11, and 12, respectively. After numbering the intervals, a bit vector value is assigned to each variable in the terms at block 46. In particular, ranges that are identified in an option are set to a "1", while ranges that are not used in an option are set to a "zero". The bit vector representation for the above "Dealer" option is set forth in Table 4.

TABLE 4

| Bit # | 5 | 4 | 3 | 2 | 1 1 | 0 | 9 | 8 | 7 | 6 | 5 | 4 | 3 | 2 | 1 | 0 0 |
|---|---|---|---|---|---|---|---|---|---|---|---|---|---|---|---|---|
| | 0 | 0 | 0 | 0 | 1 | 1 | 1 | 0 | 1 | 1 | 1 | 1 | 1 | 0 | 1 | 0 |

If a variable range r1 is a subset of another variable range r2, then r1 and r2 are checked to determine if r1 AND r2=r1. If r1 AND r2=r1, then r1 is a subset. For example, consider the condition "Dealer 39–632, 2876–3563, 4698–8312" and "Dealer 4701–7121, 3376–3558, 2913–3188". Using the above steps for assigning bit vector representations, the conditions are compiled to "Dealer 1, 3–7, 9–11" and "Dealer 4, 6, 10", respectively, and have corresponding bit vectors of 0000111011111010 and 0000010010100000 as shown below in Table 5:

TABLE 5

| Bit # | 5 | 4 | 3 | 2 | 1 1 | 0 | 9 | 8 | 7 | 6 | 5 | 4 | 3 | 2 | 1 | 0 0 |
|---|---|---|---|---|---|---|---|---|---|---|---|---|---|---|---|---|
| Range r2 | 0 | 0 | 0 | 0 | 1 | 1 | 1 | 0 | 1 | 1 | 1 | 1 | 1 | 0 | 1 | 0 |
| Range r1 | 0 | 0 | 0 | 0 | 0 | 1 | 0 | 0 | 0 | 1 | 0 | 1 | 0 | 0 | 0 | 0 |
| Logical AND | 0 | 0 | 0 | 0 | 0 | 1 | 0 | 0 | 0 | 1 | 0 | 1 | 0 | 0 | 0 | 0 |

Notice that r1 AND r2=r1 (i.e., 0000010010100000), r1 is a subset of r2. After a bit vector value has been assigned to each variable in the terms, then terms can be checked for coverage under 1-, 2-, or 3- rule coverage.

The algorithm for 2-rule coverage is the same as the algorithm described for 1-rule coverage except for two differences. First, the partial absorption rule is used instead of the absorption rule. This ensures 2-rule coverage for all coverages that do not reduce a variable to "1". Second, only the results of applying a multi-variable rule that reduce a variable to "1" are added to P (versus all results of applying a multi-variable rule). This ensures 2-rule coverage for all coverages that reduce a variable to "1".

Before describing the 2-rule coverage, the partial absorption rule is introduced. The partial absorption rule is:

$$x_r T + x_s T^- U = x_r T + x_{s-r} T^- U$$

wherein $x_{s-r} T^- U$ is omitted if $s \subset r$. Note that the partial absorption rule is a more general form of the multi-variable absorption rule which is $T+T^- U=T$. When $s \subset r$, $x_r T$ absorbs $x_s T^- U$. Only the part of $x_s T^- U$ that is absorbed is removed. Partial absorption is essentially the inverse of continuation or simplification. For example, assume that the terms in T are $x(0,4)y(1,2,3)$, $x(1)y(1,2,3,5)$, and $x(0,1,4)y(1,2)$ and that these terms are removed and added to P in the order listed. Clearly, the first two terms absorb the third term. Using the first term and applying partial absorption to the second and third terms does not change the second term but reduces the third term to $x(1)y(1,2)$, since the first term covers $x(0,4)y(1,2)$, and $x(0,4)y(1,2)$ plus $x(1)y(1,2)$ equals the third term. Finally, the second term absorbs the partially reduced third term.

Figure 5:
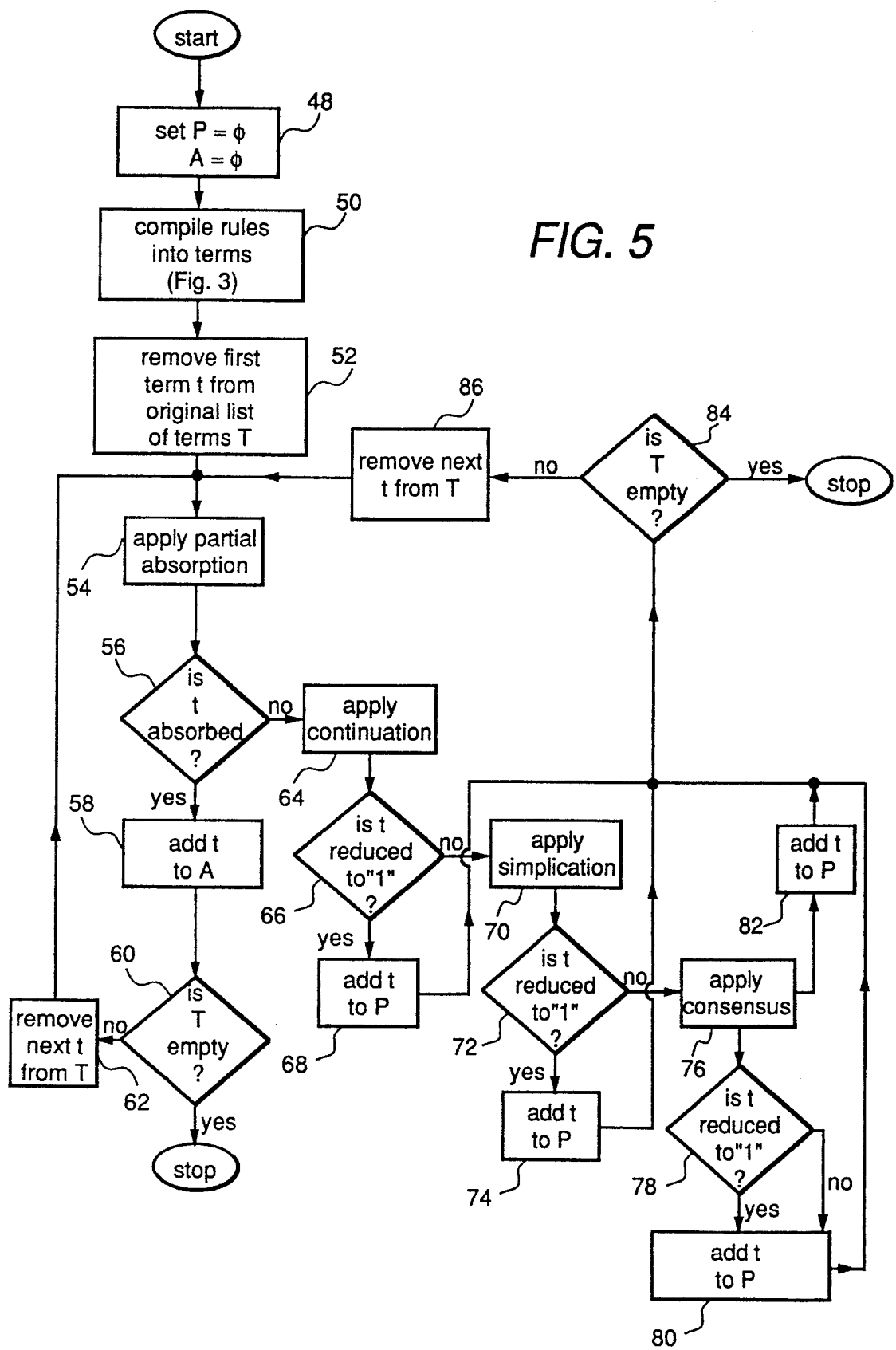
FIG. 5 is a flow-chart describing the present invention for 2-rule coverage.

FIG. 5 is a flow-chart describing the present invention for 2-rule coverage, which uses partial absorption. As in 1-rule coverage, the running sum (i.e. the SUM in Table 3) represented by variable P is set to empty and the covered term represented by the variable A is set to empty at 48. Next, the rules in the database are compiled into terms at 50 as described in FIG. 3. The first term t is removed from the original list of terms T at 52. Then the partial absorption rule is applied to term t at 54. If t is absorbed by the terms in P at 56 by one or more applications of the partial absorption rule, then the term t is covered and recorded in covered terms A at 58. If there are any more terms t left at 60, then the next term t is removed from the original list of terms T at 62 and subjected to the partial absorption rule. Otherwise, if t is not absorbed at 56, then the continuation rule is examined at 64. In the continuation rule, when two terms are combined, only one term results. If a variable in t is reduced to "1" at 66, then the modified t is added to the running sum P at 68. Then if there are any more terms t left at 84, then the next term t is removed from the original list of terms T at 86 and the above steps are repeated. Otherwise, the simplification rule is examined at 70. The implementation of the simplification rule is very similar to that of the continuation rule. If a variable in t is reduced to "1" at 72, then t is added to the running sum P at 74. Then if there are any more terms t left at 84, then the next term t is removed from the original list of terms T at 86 and the above steps are repeated. Otherwise, the consensus rule is examined at 76. Regardless, t is added to the running sum P at 80 and 82. Like the other rules, the consensus rule is implemented to find potential terms in P that contain common variables which might reduce to 1 if the consensus rule were applied. All such newly formed terms where a variable is reduced to "1" are added to P. After applying the consensus rule, a newly formed term might be absorbed by a term in P. If this condition is not checked to save time, then P might contain redundant terms, which may make the subsequent application of rules slower. Then if there are any more terms t left at 84, then the next term t is removed from the original list of terms T at 86 and the above steps are repeated.

In 2-rule coverage, the four rules of the interval-consensus procedure are used to guarantee that most of the simple cases are covered. However, applying the interval-consensus procedure is time consuming, and should be applied as infrequently as possible. It can be shown that if partial absorption is performed, then the interval-consensus procedure only needs to be applied when consensus over a variable reduces it to 1, and the new term formed by the interval-consensus procedure never needs to be used again (unless more coverage is desired). Consider again the 2-rule coverage example where the original list of terms T equals the three terms x(0)y(0), x(1)z(0), and y(0)z(0), and x only has the values 0 and 1. First, a term t is set to x(0)y(0), and it is removed from the T and added to the running sum P. Next, the term t is set to x(1)z(0). Since x(0,1) equals 1, the consensus rule is applied with x(0)y(0) to form y(0)z(0), which absorbs y(0)z(0), the third of the three terms. Fortunately, it is not common for a variable to simplify to 1 in classifying delinquent accounts since variables typically have many values. Thus, the interval-consensus procedure is rarely applied.

In a third embodiment of the present invention, there is provided a method for identifying rules that guarantee the detection of rules covered by one, two, or three rules. This method detects more cases of inconsistent rules than the first and second embodiments. The algorithm for 3-rule coverage is the same as the algorithm for 2-rule coverage described above except for two differences. First, the partial absorption rule is applied for two passes on the terms in P (if the term is not partially absorbed on the first pass, then the second pass is unnecessary). This ensures 3-rule coverage for all coverages that do not reduce a variable to "1". Second, the results of applying a multi-variable rule that reduce a variable to "1", in addition to being added to P, are used with the multi-variable rules and the other terms in P and those results that reduce a variable to "1" are also added to P. This ensures 3-rule coverage when one or two variables are reduced to "1".

Figure 6:
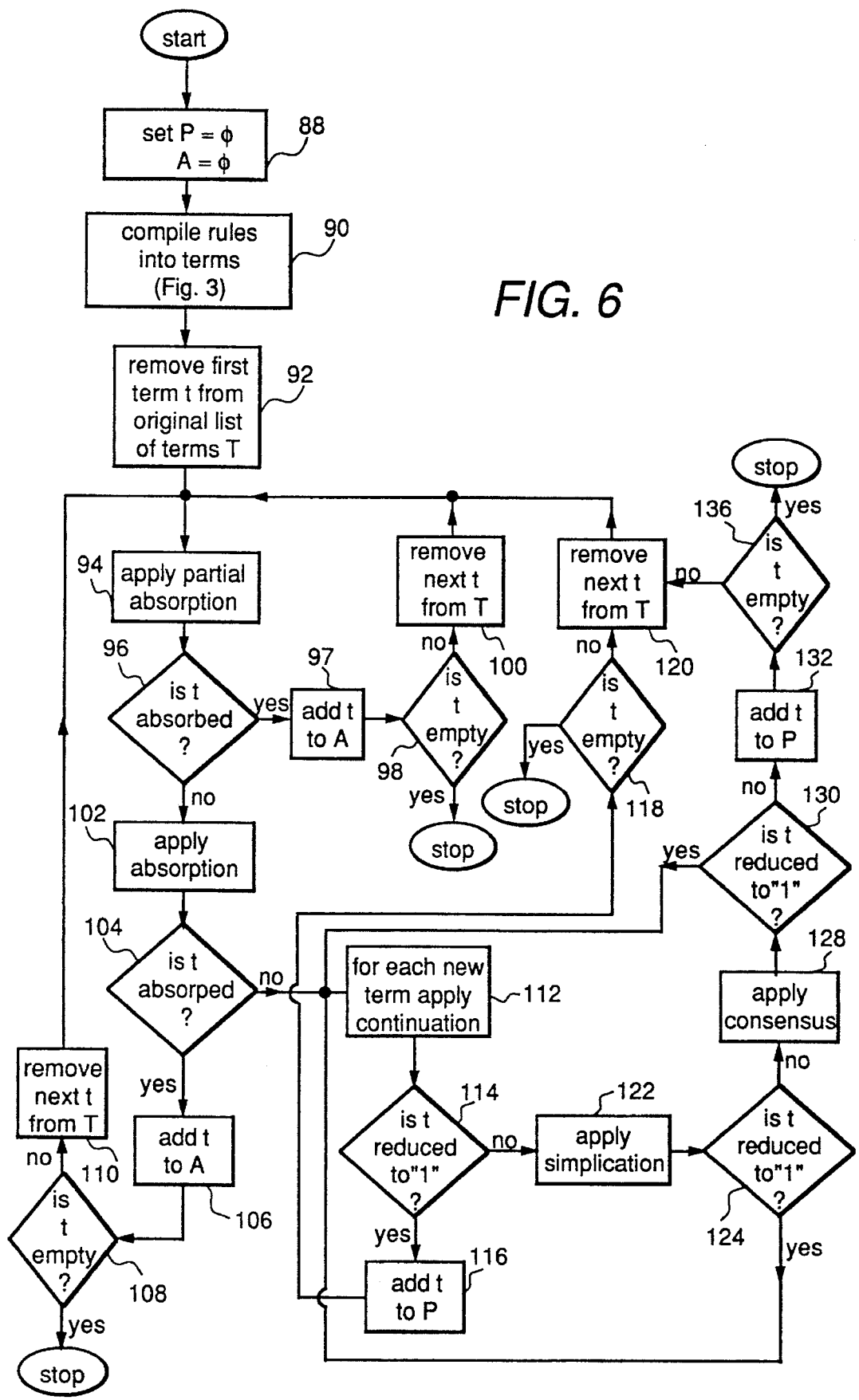
FIG. 6 is a flow-chart describing the present invention for 3-rule coverage.

FIG. 6 is a flow-chart describing the present invention for 3-rule coverage. As in 1- and 2- rule coverage, the running sum represented by variable P is set to empty and the covered terms represented by the variable A is set to empty at 88. Next, the rules in the database are compiled into terms at 90 as described in FIG. 3. The first term t is removed from the original list of terms T at 92. Then the partial absorption rule is applied to term t at 94. If t is absorbed by the terms in P at 96 by one or more applications of the partial absorption rule, then the term t is covered and recorded in covered terms A at 97. If there are any more terms t left at 98, then the next term t is removed from the original list of terms T at 100 and subjected to the partial absorption rule. Otherwise, if t is not absorbed at 96, then the absorption rule is applied at 102. If t is absorbed by the terms in P at 104, then the term t is covered and recorded in covered terms A at 106. If there are any more terms t left at 108, then the next term t is removed from the original list of terms T at 110 and subjected to the partial absorption rule at 94. Otherwise, if t is not absorbed by the terms in P at 104, then the continuation rule is examined at 112. If a variable in t is reduced to "1" at 114, then the modified t is added to the running sum P at 116. Then if there are any more terms t left at 118, then the next term t is removed from the original list of terms T at 120 and the above steps are repeated. Otherwise, the simplification rule is examined at 122. If a variable in t is reduced to "1" at 124, then t is sent to 112 where the continuation rule is examined. Then if there are any more terms t left at 118, then the next term t is removed from the original list of terms T at 120 and the above steps are repeated. Otherwise, the consensus rule is examined at 128. If no variable in t is reduced to "1", t is added to the running sum P at 132. Then if there are any more terms t left at 136, then the next term t is removed from the original list of terms T at 120 and the above steps are repeated. Otherwise, any new terms that result from the consensus by reducing a variable to "1" are sent to 112 where the continuation rule is examined.

The algorithms described in the preceding sections are efficient for performing 1-, 2-, and 3- rule coverage. However, modifications can be made to obtain greater coverage or faster results. In general, the terms in P occupy as much space as possible since P represents the space covered by the higher priority rules. Thus, when equivalent terms are added to P, the one occupying the most space is added. For example, consider the terms $x_0y_0$, $x_0y_1$, $x_1,y_0$, $x_1,y_1$, and $x_{01}y_{01}$. If the terms are added to P as written, the coverage of $x_{01}y_{01}$ is not detected. If, however, while partial absorption is being performed and the space occupied by each term is enlarged, then coverage is detected. In this example, $x_0y_0$ is the first term added to P. Next, $x_0y_1$ is considered. Since $x_0y_1$ and $x_0y_0$ combine to form $x_0y_{01}$, then $x_0y_{01}$ is added instead of $x_0y_1$ to P (at the same time $x_0y_0$ is deleted), making P={$x_{01}y_{01}$}. Next, $x_1y_0$ is considered. It is not partially absorbed, and it does not combine with any terms in P. So, it is added to P, making P={$x_{01}y_{01}$, $x_1y_0$}. Next, $x_1y_1$ is considered. It is not partially absorbed, but it does combine with $x_1y_0$ to form $x_1y_{01}$, which is added to P, making $P=\{x_0y_{01}, x_1y_{01}\}$. Now, when $x_{01}y_{01}$ is added it is absorbed with one pass of partial absorption, even under 1-rule coverage.

On the other hand, it is preferred to have the term being added to P to occupy as little space as possible, facilitating the check for coverage by the terms in P. To accomplish both objectives, two copies of the term being added are maintained. One copy is enlarged as much as possible using the continuation and simplification rules, and the other copy is shrunk as much as possible by partial absorption. If the latter copy is not absorbed, then the former copy is added to P.

Another technique for detecting more coverages in very little additional time is to apply partial absorption in repeated passes until no part of the term is absorbed. That is, if a pass of applying partial absorption with the terms in P partially absorbs the term being added, then another pass of partial absorption is applied. Also, assuming that variables are reduced to "1" infrequently, if the term being added combines with a term in P, reducing a variable to "1", then the created term is added to P like the other original terms (i.e. repeatedly checking if the created term can combine with another term in P, reducing a variable to "1" and creating more terms).

It is therefore apparent that there has been provided in accordance with the present invention, a method for verifying a plurality of rules stored in a knowledge base for consistency that fully satisfy the aims and advantages and objectives hereinbefore set forth. The invention has been described with reference to several embodiments, however, it will be appreciated that variations and modifications can be effected by a person of ordinary skill in the art without departing from the scope of the invention.

I claim:

1. A method for verifying a plurality of prioritized rules stored in a knowledge base for consistency, each prioritized rule having at least one option and a corresponding range for satisfying the option, the method comprising the steps of:

compiling each of the plurality of prioritized rules into a prioritized term, each prioritized term having at least one variable corresponding to each option and range in a rule;

arranging the prioritized terms into a hierarchical listing with high priority terms being placed before low priority terms;

for each prioritized term in the hierarchical listing, removing a highest priority term remaining in the hierarchical listing;

determining if the removed prioritized term is covered by any combination of prioritized terms in a sum of previously removed prioritized terms, the rules corresponding to the covered prioritized terms being covered; and adding each removed prioritized term to the sum of previously removed prioritized terms.

2. The method according to claim 1, wherein the step of compiling includes assigning a value to each variable, the value representing the range of each option.

3. The method according to claim 2, wherein the step of assigning includes forming a union of the ranges for each term, dividing the union of ranges into non-overlapping intervals, numbering the intervals consecutively with the smallest number beginning with zero, and assigning a bit vector to the numbered intervals.

4. The method according to claim 1, wherein the step of determining includes applying an interval consensus procedure.

5. The method according to claim 4, wherein the interval consensus procedure includes using an absorption rule to guarantee detection of rules covered by one rule.

6. The method according to claim 4, wherein the interval consensus procedure includes using a partial absorption rule, a continuation rule, a simplification rule, and a consensus rule to guarantee detection of rules covered by one and two rules.

7. The method according to claim 4, wherein the interval consensus procedure includes using an absorption rule, a partial absorption rule, a continuation rule, a simplification rule, and a consensus rule to guarantee detection of rules covered by one, two, and three rules.

8. A method for verifying a plurality of prioritized rules stored in a knowledge base for consistency, each prioritized rule having at least one option and a corresponding range for satisfying the option, the knowledge base being used in a collection system including a personal computer for editing the prioritized rules in the knowledge base, a database containing delinquent account information, and a mainframe for processing the account information with the prioritized rules, the method comprising the steps of:

compiling each of the plurality of prioritized rules into a prioritized term, each prioritized term having at least one variable corresponding to the options and ranges in the rules;

arranging the prioritized terms into a hierarchical listing with high priority terms being placed before low priority terms;

for each prioritized term in the hierarchical listing, removing a highest priority term remaining in the hierarchical listing;

determining if the removed prioritized term is covered by any combination of prioritized terms in a sum of previously removed prioritized terms, the rules corresponding to the covered prioritized terms being covered; and adding each removed prioritized term to the sum of previously removed prioritized terms.

9. The method according to claim 8, wherein the step of compiling includes assigning a value to each variable, the value representing the range of each option.

10. The method according to claim 9, wherein the step of assigning includes forming a union of the ranges for each term, dividing the union of ranges into non-overlapping intervals, numbering the intervals consecutively with the smallest number beginning with zero, and assigning a bit vector to the numbered intervals.

11. The method according to claim 8, wherein the step of determining includes applying an interval consensus procedure.

12. The method according to claim 11, wherein the interval consensus procedure includes using an absorption rule to guarantee detection of rules covered by one rule.

13. The method according to claim 11, wherein the interval consensus procedure includes using a partial absorption rule, a continuation rule, a simplification rule, and a consensus rule to guarantee detection of rules covered by one and two rules.

14. The method according to claim 11, wherein the interval consensus procedure includes using an absorption rule, a partial absorption rule, a continuation rule, a simplification rule, and a consensus rule to guarantee detection of rules covered by one, two, and three rules.

15. A method for verifying a plurality of prioritized rules stored in a knowledge base for consistency, each prioritized rule having at least one option and a corresponding range for satisfying the option, the knowledge base being used in a collection system including a personal computer for editing the prioritized rules in the knowledge base, a database containing delinquent account information, and a mainframe for processing the account information with the prioritized rules, the method comprising the steps of:

compiling each of the plurality of prioritized rules into a prioritized term in the mainframe, each prioritized term having at least one variable corresponding to the options and ranges in the rules;

arranging the prioritized terms into a hierarchical listing in the mainframe with high priority terms being placed before low priority terms;

for each prioritized term in the hierarchical listing, removing a highest priority term remaining in the hierarchical listing;

determining if the removed prioritized term is covered by any combination of prioritized terms in a sum of previously removed prioritized terms, the rules corresponding to the covered prioritized terms being covered;

adding each removed prioritized term to the sum of previously removed prioritized terms;

applying uncovered prioritized terms to the accounts in the account database; and initiating collection of delinquent accounts after the uncovered prioritized terms have been applied to the account database.

\* \* \* \* \*